United States Patent [19]

Olah et al.

[11] Patent Number: 5,922,635
[45] Date of Patent: Jul. 13, 1999

[54] NANOSCALE SOLID SUPERACID CATALYSTS WITH PENDANT FLUOROALKYLSULFONIC ACID OR FLUORO, PERFLUOROALKYLSULFONIC ACID GROUPS

[76] Inventors: George A. Olah, 2252 Gloaming Way, Beverly Hills, Calif. 90210; G. K. Surya Prakash, 1946 Deerpeak Dr., Hacienda Heights, Calif. 91745

[21] Appl. No.: 09/073,528

[22] Filed: May 6, 1998

Related U.S. Application Data

[60] Provisional application No. 60/046,338, May 7, 1997.

[51] Int. Cl.[6] .............................. B01J 31/00; B01J 27/02; B01J 27/06; C07F 9/22
[52] U.S. Cl. ..................... 502/168; 502/216; 502/224; 502/507; 502/508; 502/159; 562/30; 562/100
[58] Field of Search ............................... 502/168, 216, 502/224, 507, 508, 159; 423/445 B, DIG. 39, DIG. 40; 562/30, 100

[56] References Cited

U.S. PATENT DOCUMENTS

| | | | |
|---|---|---|---|
| 2,732,398 | 1/1956 | Brice et al. | 260/503 |
| 3,920,582 | 11/1975 | Rona | 502/168 |
| 4,044,069 | 8/1977 | Bernard et al. | 260/683.47 |
| 4,547,474 | 10/1985 | Olah | 502/168 |
| 4,697,007 | 9/1987 | Seitz et al. | 502/168 |
| 4,721,559 | 1/1988 | Olah | 502/168 |
| 5,179,052 | 1/1993 | Knifton | 502/62 |
| 5,220,087 | 6/1993 | Berenbaum et al. | 585/462 |
| 5,288,685 | 2/1994 | Kallenbach et al. | 502/168 |
| 5,294,732 | 3/1994 | Chiang et al. | 423/445 B |
| 5,336,833 | 8/1994 | Joly et al. | 502/216 |
| 5,571,762 | 11/1996 | Clerici et al. | 502/216 |
| 5,648,523 | 7/1997 | Chiang | 562/100 |

*Primary Examiner*—Mark L. Bell
*Assistant Examiner*—Patricia L. Hailey
*Attorney, Agent, or Firm*—Pennie & Edmonds LLP

[57] ABSTRACT

A solid superacid catalyst composition of a carrier material having a particle size of between 0.5 and 5000 nm and at least one pendant fluoroalkylsulfonic acid or fluoro, perfluoroalkylsulfonic acid group attached thereto. Also, methods for making this catalysts by attaching pendant fluoroalkylsulfonic acid or fluoro, perfluoroalkylsulfonic acid groups to the carrier material by various procedures to form the catalyst composition.

21 Claims, No Drawings

NANOSCALE SOLID SUPERACID CATALYSTS WITH PENDANT FLUOROALKYLSULFONIC ACID OR FLUORO, PERFLUOROALKYLSULFONIC ACID GROUPS

CROSS-REFERENCE TO RELATED APPLICATIONS

This application claims the benefit of Provisional Application Ser. No. 60/046,338, filed May 7, 1997.

FIELD OF THE INVENTION

The present invention relates to methods of attaching pendant superacid groups to suitable nanoscale carrier materials, and the use of such products as catalysts. In particular, the invention relates to methods of attaching fluoroalkylsulfonic acid and fluoro, perfluoroalkylsulfonic acid groups to suitable nanoscale carrier materials, and the use of such products as catalysts in hydrocarbon transformation reactions including, but not limited to substitution and addition reactions, polymerizations, hydrogenations and oxidations.

BACKGROUND OF THE INVENTION

There is an increasing need to replace environmentally hazardous and toxic acid catalysts such as $H_2SO_4$, HF, $AlCl_3$, $AlBr_3$, $BF_3$ and the like with convenient, environmentally safe, and effective solid superacid catalysts. In spite of extensive work on solid acid catalysts such as zeolites, high surface area mesopores (MCM-41, etc.) silica-alumina, acid clays, heteropolyacids etc., none of these systems have truly superacidic properties. Nafion-H type polymeric resin materials having perfluoroalkylpolyether back-bones containing tethered —$CF_2SO_3H$ groups are solid Bronsted superacids, but they lack thermal stability and high surface area properties. In comparison the parent liquid trifluoromethanesulfonic acid, $CF_3SO_3H$, has a Hammett's acidity constant, $H_0$, of $-14.1$. (G. A. Olah, et al., *Superacids*, Wiley Interscience, 1985.) Thus, there is a need for new, nontoxic, stable superacid catalysts.

SUMMARY OF THE INVENTION

The present invention discloses that fluoroalkylsulfonic acid and fluoro, perfluoroalkylsulfonic acid groups are capable of providing superacidity ($H_0$ in the range of $-13$ to $-14$) when tethered to suitable solid carrier materials. The carrier materials may be chosen from suitable nanoscale carrier structures including, but not limited to buckminsterfullerenes, polystyrenes including cross-linked polystyrene spherical beads, and polyolefins.

In one aspect, the invention includes a method of attaching the fluoroalkylsulfonic acid or fluoro, perfluoroalkylsulfonic acid group to the solid carrier material by reacting such carrier material with a halofluorocarboxyl peroxide or a halofluorocarboxyl anhydride, or the corresponding halofluoroperfluoroalkyl derivative to form a halofluoro adduct, and subsequent treatment with a thiosulfate compound followed by oxidation to produce the fluoroalkylsulfonic acid or fluoro, perfluoroalkylsulfonic acid product.

In another aspect, the invention discloses a method of attaching the fluoroalkylsulfonic acid or fluoro, perfluoroalkylsulfonic acid group to the solid carrier material by reacting the carrier material with novel silylated fluoroalkylsulfonating reagents of the form: $(CH_3)_3Si(CF_2)_nSO_3R$, or silylated fluoro, perfluoroalkylsulfonating reagents of the form: $(CH_3)_3SiCFR_FSO_3R$ to form the sulfonic ester adduct, followed by hydrolysis to produce the fluoroalkylsulfonic acid or fluoro, perfluoroalkylsulfonic acid product.

The resulting solid superacid catalyst composition represents another aspect of the invention. These catalysts include a carrier material having a particle size of between 0.5 and 5000 nm and one or more pendant fluoroalkylsulfonic acid or fluoro, perfluoroalkylsulfonic acid groups attached thereto. These catalyst compositions are used to facilitate typical acid catalyzed hydrocarbon rearrangement transformation reactions.

DETAILED DESCRIPTION OF THE INVENTION

Acid catalysts such as sulfuric acid, hydrofluoric acid, aluminum chloride, aluminum bromide and boron trifluoride are commonly used in industry, but have the drawback of being hazardous to the environment. The present invention discloses efficient novel solid superacid catalyst combinations, methods of production of these novel catalyst combinations by the attachment of fluoroalkylsulfonic acid or fluoro, perfluoroalkylsulfonic acid groups to suitable solid nanoscale carrier materials, and describes the use of the novel catalyst combinations to bring about typical acid catalyzed hydrocarbon rearrangement reactions. These novel superacid combinations exhibit the efficacy, convenience of use, and improved environmental safety associated with high surface area solid acid catalysts, combined with superacidity of a magnitude comparable to that of trifluoromethanesulfonic acid.

The acid groups of the present invention are preferably of the fluoroalkylsulfonic acid type: —$(CF_2)_nSO_3H$, where n is an integer between 1 and 8; or of the fluoro, perfluoroalkylsulfonic acid type: —$(CF_2)_nCFR_FSO_3H$, where n is an integer between 0 and 7, and RF is a perfluoroalkyl group with a backbone of between 1 and 18 carbon atoms.

In one embodiment, the present invention discloses a method for the introduction of the superacid functionality groups onto a solid carrier consisting of a fullerene. Buckminsterfullerene, $C_{60}$, with a molecular diameter of 1 nm can be considered as the smallest nanosphere. When reacted with halofluorocarboxylic peroxide (or halofluorocarboxylic anhydride) under mild heating —$(CF_2)_nX$ (X=Cl, Br) groups can be introduced onto $C_{60}$. Similarly, reaction with halofluoro perfluoroalkylcarboxylic peroxide (or halofluoro perfluoroalkylcarboxylic anhydride) under mild heating leads to introduction of —$(CF_2)_nCFR_FX$ groups onto $C_{60}$. Other methods were also developed (Yoshida, et al., *Chemistry Letters*, 1097 (1996) and references cited therein). It has now been discovered that such polyhalofluoroalkylated and polyhalofluoro perfluoroalkylated fullerenes can be converted to their corresponding fullerene-polysulfonic acids by treatment with sodium thiosulfate followed by oxidation giving the corresponding fluoroalkylsulfonic and fluoro, perfluoroalkylsulfonic acids. These high surface area new nanoscale Bronsted superacid catalysts are highly effective to carry out varied typical electrophilic hydrocarbon transformations. For example, the reaction of $C_{60}$ with halodifluoroacetyl peroxide (or halodifluoroacetic anhydride) is shown below.

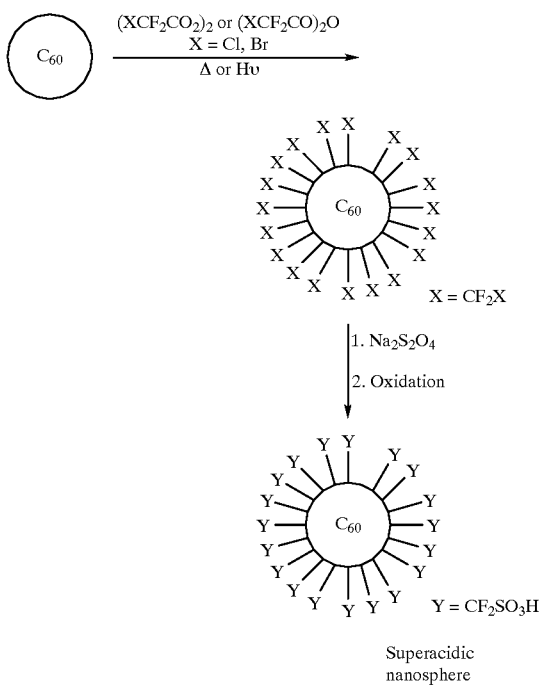

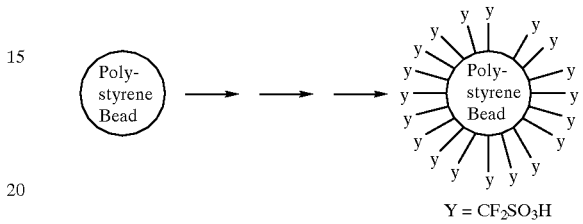

Y = CF$_2$SO$_3$H

Cross-linked polystyrene spherical beads with specific uniform dimension (100 to 5000 nm size) are available by controlled emulsion polymerization of styrene and divinylbenzene (and related cross-linking agents). These beads, when reacted under the above disclosed conditions of fluoroalkylsulfonation or fluoro, perfluoroalkylsulfonation, produce surface modified beads of high Bronsted superacidity. For example, the reaction of a polystyrene bead with chlorodifluoroacetyl peroxide (or chlorodifluoroacetyl anhydride) is shown below.

Superacidic nanosphere

In another embodiment of the present invention, similar methodology was also found to be effective to introduce fluoroalkylsulfonic acid and fluoro perfluoroalkylsulfonic acid groups into polystyrene in high yield and with high para selectivity. The process is particularly effective when carried out with initial reaction of the polystyrene with CF$_2$X$_2$ under ultraviolet irradiation. For example, the reaction of polystyrene with chlorodifluoroacetyl peroxide or chlorodifluoroacetyl anhydride) is shown below.

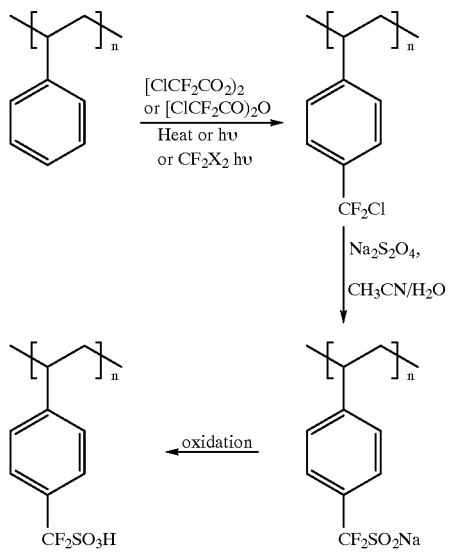

representative, non-limiting member of the class of superacid functionality groups which may be attached to suitable solid carrier materials is esterified difluorosulfonic acid —(CF)$_2$SO$_3$R. In a further embodiment, the present invention discloses a convenient way to introduce the previously mentioned superacid functional groups onto the solid carrier by reaction using a silicon reagent: TMS—CF$_2$SO$_3$R which allows the general direct introduction of —CF$_2$SO$_3$R groups and via hydrolysis the —CF$_2$SO$_3$H acid function into varied carriers. It can be prepared by reacting CF$_2$Br$_2$ with Na$_2$S$_2$O$_4$ under photolytic conditions giving BrCF$_2$SO$_2$Na which upon oxidation (such as with H$_2$O$_2$ or by other means) leads to BrCF$_2$SO$_3$H. Bromodifluoromethanesulfonic acid can be transformed to its corresponding trimethylsilyl derivatives by aluminum induced reductive procedures resulting in (CH$_3$)$_3$SiCF$_2$SO$_3$H (TMS—CF$_2$SO$_3$H). When esterified it gives (CH$_3$)$_3$SiCF$_2$SO$_3$R (TMS—CF$_2$SO$_3$R) reagents which react analogous to the well explored reactions of TMS—CF$_3$ (G. A. Olah, et al., eds., Synthetic Fluorine Chemistry, Wiley Interscience, 1992) allowing introduction of pendant —CF$_2$SO$_3$R groups into varied polymeric carriers giving after hydrolysis novel solid superacids P—CF$_2$SO$_3$H.

More generally, the method of the present invention can be applied to introduce —(CF$_2$)$_n$SO$_3$R and —(CF$_2$)$_n$CFR$_F$SO$_3$R homologous superacid functional groups, by reaction of the solid carrier material with the corresponding trimethylsilyl fluoroalkylsulfonic acid.

Vinyl monomers with pendant —(CF$_2$)$_n$SO$_3$R and

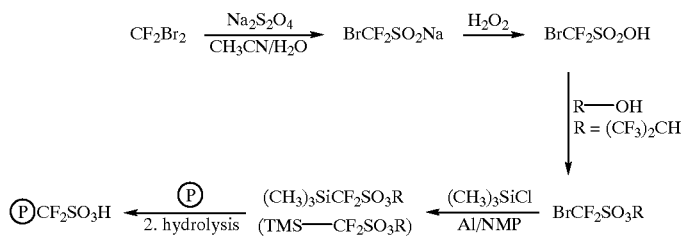

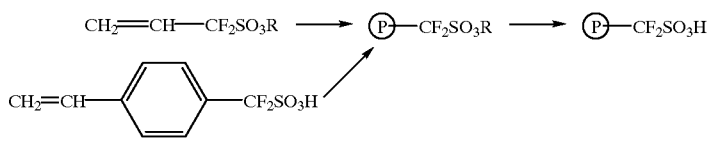

—(CF$_2$)$_n$CFR$_F$SO$_3$R groups can be also prepared and subsequently polymerized to suitable molecular weight polymeric solid superacids.

[structure diagram showing styrene monomers with CF$_2$SO$_3$R and CF$_2$SO$_3$H groups polymerizing to polymer-CF$_2$SO$_3$R then to polymer-CF$_2$SO$_3$H]

The prepared solid superacid catalysts with pendant —(CF$_2$)$_n$SO$_3$R and —(CF$_2$)$_n$CFR$_F$SO$_3$R groups are effective superacidic catalysts to bring about such typical transformations as substitution and addition reactions, polymerizations, hydrogenation, oxidation and the like (acid catalyzed hydrocarbon transformations are summarized for example in the monograph Olah, G. A., et al, "Hydrocarbon Chemistry", Wiley-Interscience, New York, 1995.)

EXAMPLES

Certain embodiments and features of the invention are illustrated, and not limited, by the following working examples.

Example 1: Fullerenepolydifluoromethylsulfonic Acid

C$_{60}$ (720 mg) upon treatment with a twelve molar excess of halodifluoroacetyl peroxide ((XCF$_2$CO$_2$)$_2$, X=Cl, Br) under heat, 80° C., or UV light (medium pressure Hg vapor lamp) over 8 h period gave a polyhalodifluoromethylated C$_{60}$ mixture. The number of XCF$_2$ groups on C$_{60}$ is around 7–10 (the reaction with the corresponding anhydride is, however, sluggish and the thermal reaction has to be carried out at 150° C. in a sealed glass vessel). Similar reaction with CF$_2$Br$_2$ under UV irradiation also provides the poly(—CF$_2$—Br) product. The obtained mixture was treated Na$_2$S$_2$O$_4$, (1.8 g) and NaHCO$_3$, (1.0 g) in 10 mL of deionized water under reflux for 12 h. The resulting mixture was filtered and the aqueous solution was evaporated to dryness to obtain a dark brown precipitate composed of crude, poly(sodium difluorobenzylsulfinate)C$_{60}$ salt. The crude polysulfinate salt was treated with 2 mL of 30% H$_2$O$_2$ and stirred overnight to obtain a dark brown solid which was filtered and repeatedly washed with toluene and dried under efficient vacuum at room temperature to obtain the mixture of fullerene polysulfonic acid (1.2 g).

Example 2: Polystyrene Difluoromethylsulfonic Acid

Polystyrene (1 g) was treated with 2 molar excess (per styrene unit) of halodifluoroacetyl peroxide as in Example (1) over a period of 8 h. The resulting solid was treated with Na$_2$S$_2$O$_4$, (1.8 g) and NaHCO$_3$, (0.9 g) in 10 mL of deionized water under reflux for 12 h. After filtration, the pale yellow solid was washed repeatedly with deionized water and treated with 30% aqueous hydrogen peroxide (2 mL) overnight at room temperature. The solid was filtered and washed with 2N HCl repeatedly and dried over dynamic vacuum to obtain 1.3 grams of the polystyrene polysulfonic acid.

Example 3: Polystyrene Bead Difluoromethylsulfonic acid

Polystyrene beads (1 g) were treated with 2 molar excess (per styrene unit) of halodifluoroacetyl peroxide as in Example (1) over a period of 8 h. The resulting solid was treated with Na$_2$S$_2$O$_4$, (1.8 g) and NaHCO$_3$, (0.9 g) in 10 mL of deionized water under reflux for 12 h. After filtration, the pale yellow solid was washed repeatedly with deionized water and treated with 30% aqueous hydrogen peroxide (2 mL) overnight at room temperature. The solid was filtered and washed with 2N HCl repeatedly and dried over dynamic vacuum to obtain 1.3 grams of the polystyrene polysulfonic acid.

Example 4: TMS—CF$_2$SO$_3$R (R=TMS)

CF$_2$Br$_2$ (21 g, 100 mmol) was treated with Na$_2$S$_2$O$_4$, (37 g) and NaHCO$_3$, (18 g) in 200 mL of deionized water and acetonitrile (1:1 mixture) under reflux for 12 h. The obtained solid was washed with water and treated with 40 mL of 30% aqueous hydrogen peroxide. The resulting solid was dried and treated with 100% sulfuric acid. The bromomethanesulfonic acid was distilled in vacuum (10 Torr) at 70° C. The acid was found to be a hygroscopic low melting solid (10.8 g). It was directly treated with dry TMS—Cl (with triethyl amine) to obtain Br—CF$_2$SO$_3$Si(CH$_3$)$_3$. The TMS-bromodifluoromethylsulfonate was treated with TMS—Cl (10 g) and dry Al (2.7 g) powder in N-Methylpyrrolidinone (200 mL) to obtain 3.2 g of TMS—CF$_2$SO$_3$TMS. The reagent was found to react with various polymers containing electrophilic functional groups to deliver —CF$_2$SO$_3$TMS groups under fluoride ion initiation.

Example 5: Friedel-Crafts Reaction Catalyzed by Polystyrene Polysulfonic Acid 10 mL of benzene was treated with benzoyl chloride (2.5 g, 20 mmol) in the presence of dry polystyrene polysulfonic acid catalyst (200 mg). The mixture was heated under reflux to obtain benzophenone (2.5 g, 68% yield). Similar reaction has been found effective for nitration, alkylation, halogenation and related electrophilic reactions.

What is claimed is:

1. A solid superacid catalyst composition comprising a carrier material having a particle size of between 0.5 and 5000 nm and at least one pendant fluoroalkylsulfonic acid or fluoro, perfluoroalkylsulfonic acid group attached thereto.

2. The composition of claim 1 wherein the pendant fluoroalkylsulfonic acid groups have the formula $-(CF_2)_nSO_3H$, where n is an integer of 1 to 8.

3. The composition of claim 1 wherein the pendant fluoro, perfluoroalkylsulfonic acid groups have the formula $-(CF_2)_nCFR_FSO_3H$, where n is an integer of 0 to 7, and $R_F$ is a perfluoroalkyl group with a backbone of between 1 and 18 carbon atoms.

4. The composition of claim 1, wherein the carrier material is a fullerene having a size of about 1 nm.

5. The composition of claim 1, wherein the carrier material is a polystyrene, or a polystyrene bead having a size of between about 100 and 5000 nm.

6. The composition of claim 1, wherein the carrier material is a polyolefin.

7. The composition of claim 1, wherein the number of fluoroalkylsulfonic acid or fluoro, perfluoroalkylsulfonic acid groups attached to the carrier material is between 2 and 8.

8. The composition of claim 1, wherein the fluoroalkylsulfonic acid or fluoro, perfluoroalkylsulfonic acid groups are attached in a molar ratio of about 5% to 100% of the carrier material.

9. A process for preparing a solid superacid catalyst composition, which comprises:

selecting a carrier material having a particle size between about 0.5 and 5000 nm; and attaching pendant fluoroalkylsulfonic acid or fluoro, perfluoroalkylsulfonic acid groups to the carrier material to form the composition.

10. The process of claim 9, wherein the fluoroalkylsulfonic acid groups are attached to the carrier material by reacting the carrier material with a halofluorocarboxylic peroxide to form a halofluoroalkyl adduct, reacting the halofluoroalkyl adduct with a thiosulphate compound to form a fluoroalkylsulfonate adduct, and oxidizing the fluoroalkylsulfonate adduct to form the fluoroalkylsulfonic acid product.

11. The process of claim 9, wherein the fluoro, perfluoroalkylsulfonic acid groups are attached to the carrier material by reacting the carrier material with a halofluoro, perfluoroalkylcarboxylic peroxide to form a halofluoro, perfluoroalkyl adduct, reacting the halofluoro, perfluoroalkyl adduct with a thiosulphate compound to form a fluoro, perfluoroalkylsulfonate adduct, and oxidizing the fluoro, perfluoroalkylsulfonate adduct to form the fluoro, perfluoroalkylsulfonic acid product.

12. The process of claim 11, wherein the halofluorocarboxylic peroxide has the formula $(X(CF_2)_nCO_2)_2$, where X is chlorine or bromine, and n is an integer of 1 to 8.

13. The process of claim 11, wherein the halofluoro, perfluoroalkylcarboxylic peroxide has the formula $(X(CF_2)_nCFR_FCO_2)_2$, where X is chlorine or bromine, and n is an integer of 0 to 7, and RF is a perfluoroalkyl group with a backbone of between 1 and 18 carbon atoms.

14. The process of claim 9, wherein the fluoroalkylsulfonic acid groups are attached to the carrier material by reacting the carrier material with a halofluorocarboxylic anhydride to form a halofluoroalkyl adduct, reacting the halofluoroalkyl adduct with a thiosulphate compound to form a fluoroalkylsulfonate adduct, and oxidizing the fluoroalkylsulfonate adduct to form the fluoroalkylsulfonic acid product.

15. The process of claim 9, wherein the fluoro, perfluoroalkylsulfonic acid groups are attached to the carrier material by reacting the carrier material with a halofluoro, perfluoroalkylcarboxylic anhydride to form a halofluoro, perfluoroalkyl adduct, reacting the halofluoro, perfluoroalkyl adduct with a thiosulphate compound to form a fluoro, perfluoroalkylsulfonate adduct, and oxidizing the fluoro, perfluoroalkylsulfonate adduct to form the fluoro, perfluoroalkylsulfonic acid product.

16. The process of claim 14, wherein the halofluorocarboxylic anhydride has the formula $(X(CF_2)_nCO)_2O$, where X is chlorine or bromine, and n is an integer of 1 to 8.

17. The process of claim 15, wherein the halofluoro, perfluoroalkylcarboxylic anhydride has the formula $(X(CF_2)_nCFR_FCO)_2O$, where X is chlorine or bromine, and n is an integer of 0 to 7, and $R_F$ is a perfluoroalkyl group with a backbone of between 1 and 18 carbon atoms.

18. The process of claim 9, wherein the fluoroalkylsulfonic acid groups are attached to the carrier material by reacting the carrier material with a silylated fluoroalkylsulfonating agent to form a fluoroalkylsulfonate adduct, followed by hydrolyzing the fluoroalkylsulfonate adduct to form the fluoroalkylsulfonic acid product.

19. The process of claim 9, wherein the fluoro, perfluoroalkylsulfonic acid groups are attached to the carrier material by reacting the carrier material with a silylated fluoro, perfluoroalkylsulfonating agent to form a fluoro, perfluoroalkylsulfonate adduct, followed by hydrolyzing the fluoro, perfluoroalkylsulfonate adduct to form the fluoro, perfluoroalkylsulfonic acid product.

20. The process of claim 18, wherein the silylated fluoroalkylsulfonating agent has the formula $(CH_3)_3Si(CF_2)_nSO_3R$, where n is an integer of 1 to 8.

21. The process of claim 18, wherein the silylated fluoro, perfluoroalkylsulfonating agent has the formula $(CH_3)_3Si(CF_2)_nCFR_FSO_3R$, where n is an integer of 0 to 7, and $R_F$ is a perfluoroalkyl group with a backbone of between 1 and 18 carbon atoms.

* * * * *